US010402640B1

United States Patent
Becker et al.

(10) Patent No.: US 10,402,640 B1
(45) Date of Patent: Sep. 3, 2019

(54) METHOD AND SYSTEM FOR SCHEMATIZING FIELDS IN DOCUMENTS (71) Applicants: Richard Becker, Edmonton (CA); Kimia Hassanzadeh, Edmonton (CA)

(72) Inventors: Richard Becker, Edmonton (CA); Kimia Hassanzadeh, Edmonton (CA)

(73) Assignee: Intuit Inc., Mountain View, CA (US)

( * ) Notice: Subject to any disclaimer, the term of this patent is extended or adjusted under 35 U.S.C. 154(b) by 122 days.

(21) Appl. No.: 15/799,414

(22) Filed: Oct. 31, 2017

(51) Int. Cl.
*G06K 9/00* (2006.01)
*G06K 9/62* (2006.01)
*G06N 3/04* (2006.01)

(52) U.S. Cl.
CPC ..... *G06K 9/00456* (2013.01); *G06K 9/00449* (2013.01); *G06K 9/00463* (2013.01); *G06K 9/00469* (2013.01); *G06K 9/6256* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 6,664,531 | B2 * | 12/2003 | Gartner | G01B 11/245 250/208.1 |
| 9,151,830 | B2 * | 10/2015 | Bridges | G01C 15/002 |
| 9,967,545 | B2 * | 5/2018 | Tohme | G01C 15/002 |
| 2010/0265316 | A1 * | 10/2010 | Sali | H04N 13/254 348/46 |
| 2011/0025827 | A1 * | 2/2011 | Shpunt | G01B 11/22 348/47 |
| 2011/0035952 | A1 * | 2/2011 | Roithmeier | G01B 11/002 33/503 |
| 2011/0043620 | A1 * | 2/2011 | Svanholm | G01C 1/04 348/135 |
| 2011/0052006 | A1 * | 3/2011 | Gurman | G06K 9/00201 382/103 |

(Continued)

OTHER PUBLICATIONS

Amara, J., Kaur, P., Owonibi, M., & Bouaziz, B. (2017). Convolutional neural network based chart image classification. (Year: 2017).*

(Continued)

*Primary Examiner* — Andrae S Allison
(74) *Attorney, Agent, or Firm* — Ferguson Braswell Fraser Kubasta (57) ABSTRACT

A method for schematizing fields in documents involves segmenting an image of a document into snippets, classifying a first, a second, and a third snippet of the snippets as a first label, a second label, and a data field, respectively. The method further includes generating, for a combination of the first label and the data field, a first image to be classified, and classifying the first image to be classified to obtain a first classification score. The method further includes generating, for a combination of the second label and the data field, a second image to be classified, and classifying the second image to be classified to obtain a second classification score. The method also includes determining that the first classification score is greater than the second classification score and identifying, based on the determining step, that the data field is associated with the first label.

25 Claims, 6 Drawing Sheets

(56) References Cited

U.S. PATENT DOCUMENTS

| | | | | |
|---|---|---|---|---|
| 2013/0246067 A1* | 9/2013 | Mailhot | ................ | G16H 15/00 |
| | | | | 704/260 |
| 2014/0281878 A1* | 9/2014 | Golan | ................... | G06F 16/355 |
| | | | | 715/232 |
| 2015/0178900 A1* | 6/2015 | Kim | ......................... | G06T 5/50 |
| | | | | 382/154 |
| 2017/0357627 A1* | 12/2017 | Peterson | .............. | G06F 17/243 |

OTHER PUBLICATIONS

Wu, Pin, et al. "Convolutional Neural Network Based Structured Data Field Granularity Classification Method." IOP Conference Series: Materials Science and Engineering. vol. 435. No. 1. IOP Publishing, 2018. (Year: 2018).*

Chen, Kai, et al. "Convolutional neural networks for page segmentation of historical document images." 2017 14th IAPR International Conference on Document Analysis and Recognition (ICDAR). vol. 1. IEEE, 2017. (Year: 2017).*

* cited by examiner

METHOD AND SYSTEM FOR SCHEMATIZING FIELDS IN DOCUMENTS

BACKGROUND

Despite the increasingly popular paperless exchange of information, some data may still be provided as paper-based documents or forms and/or imaged forms. In order to process these data, the documents or forms may be required in digital format. Manually entering the data into a computing system by a human operator may be time consuming, error-prone, and costly. Accordingly, automating the extraction of data from imaged versions of documents may be beneficial.

SUMMARY

In general, in one aspect, one or more embodiments relate to a method for schematizing fields in documents. The method comprises: segmenting an image of a document into a plurality of snippets; classifying a first snippet of the plurality of snippets as a first label, based on content of the first snippet; classifying a second snippet of the plurality of snippets as a second label; classifying a third snippet of the plurality of snippets as a data field; selecting a first combination comprising the first label and the data field; generating, for the first combination, a first image to be classified, comprising the first label and the data field; classifying the first image to be classified using a schematization model to obtain a first classification score; selecting a second combination comprising the second label and the data field; generating, for the selected second combination, a second image to be classified, comprising the second label and the data field; classifying the second image to be classified using the schematization model to obtain a second classification score; determining that the first classification score is greater than the second classification score; and identifying, based on the determining step, that the data field is associated with the first label.

In general, in one aspect, one or more embodiments relate to a non-transitory computer-readable storage medium storing a program, which when executed on a processor, performs instructions comprising: segmenting an image of a document into a plurality of snippets; classifying a first snippet of the plurality of snippets as a first label, based on content of the first snippet; classifying a second snippet of the plurality of snippets as a second label; classifying a third snippet of the plurality of snippets as a data field; selecting a first combination comprising the first label and the data field; generating, for the first combination, a first image to be classified, comprising the first label and the data field; classifying the first image to be classified using a schematization model to obtain a first classification score; selecting a second combination comprising the second label and the data field; generating, for the selected second combination, a second image to be classified, comprising the second label and the data field; classifying the second image to be classified using the schematization model to obtain a second classification score; determining that the first classification score is greater than the second classification score; and identifying, based on the determining step, that the data field is associated with the first label.

In general, in one aspect, one or more embodiments relate to a system for schematizing fields in documents. The system comprises: a hardware processor and memory; software instructions stored in the memory and configured to execute on the hardware processor, which, when executed cause the hardware processor to: segment an image of a document into a plurality of snippets; classify a first snippet of the plurality of snippets as a first label, based on content of the first snippet; classify a second snippet of the plurality of snippets as a second label; classify a third snippet of the plurality of snippets as a data field; select a first combination comprising the first label and the data field; generate, for the first combination, a first image to be classified, comprising the first label and the data field; classify the first image to be classified using a schematization model to obtain a first classification score; select a second combination comprising the second label and the data field; generate, for the selected second combination, a second image to be classified, comprising the second label and the data field; classify the second image to be classified using the schematization model to obtain a second classification score; determine that the first classification score is greater than the second classification score; and identify, based on the determining step, that the data field is associated with the first label.

Other aspects of the invention will be apparent from the following description and the appended claims.

BRIEF DESCRIPTION OF DRAWINGS

FIGS. 5.1, 5.2, and 5.3 show examples in accordance with one or more embodiments of the invention.

FIGS. 6.1 and 6.2 show a computing system in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, one or more embodiments provide a method and a system for schematizing fields in documents. A document may be a form that includes data in an at least partially structured format. The structure of the document, in accordance with one or more embodiments, facilitates the extraction of the data because, to some degree, the location of various data fields in the document, the format of the data, data labels, and/or other characteristics may be known, although significant variations may, nevertheless, exist between documents of the same type. Fields that are identified in a document may be schematized based on these known characteristics, in accordance with one or more embodiments of the invention. A successfully completed schematization of the data fields in a document results in labels being properly assigned to these data fields, such that the content of these data fields can be properly interpreted after extraction from the document. This process may enable further digital processing of the data obtained from the document.

Figure 1:
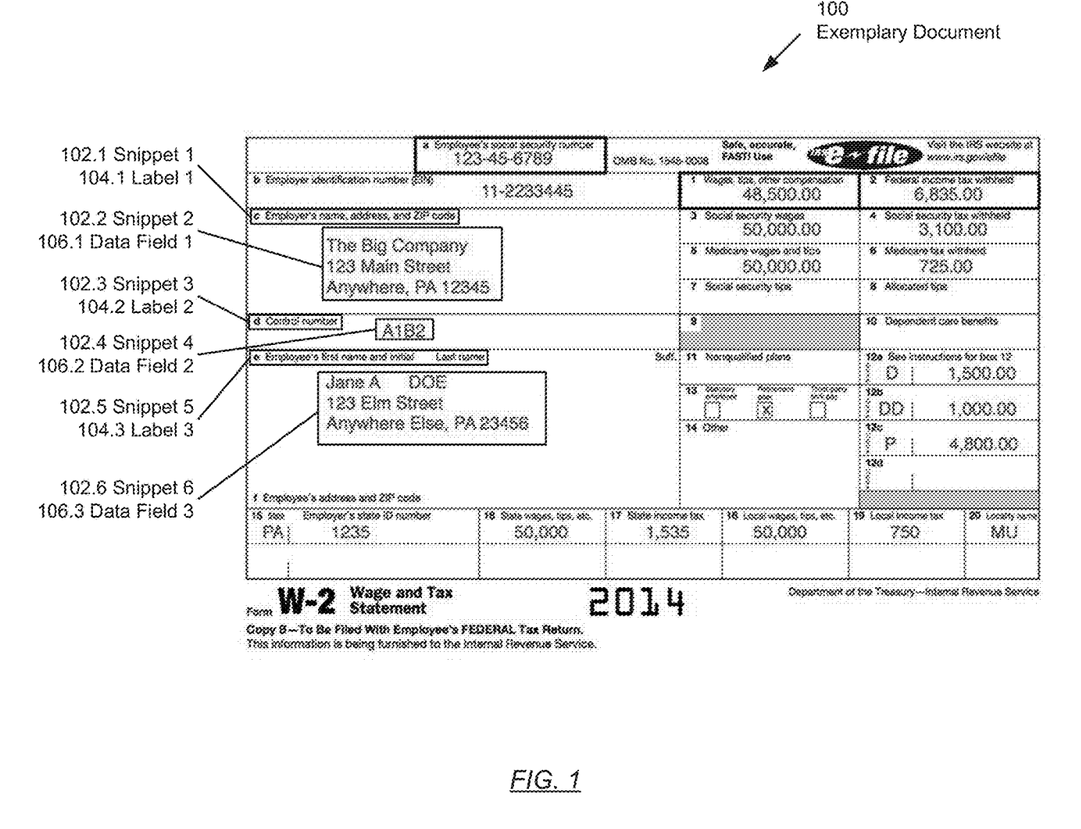
FIG. 1 shows an exemplary document in accordance with one or more embodiments of the invention.

FIG. 1 shows an exemplary document (100), in accordance with one or more embodiments of the invention. Although the shown document is a tax form, those skilled in the art will appreciate that a document may be any other type of document that includes at least some degree of structure. Due to the structure, data of a particular type may be expected to be found at a particular location, in the document. For example, in the exemplary tax form, the employer's name and address may be found in one box, whereas the employee's name and address may be found in another box. In FIG. 1, six snippets (102.1-102.6) are highlighted. A snippet, in accordance with one or more embodiments of the invention, is an area that has been isolated in an imaged document. Such a segmentation may be performed using a segmentation algorithm that generates a bounding box surrounding each text cluster that is recognized in the imaged form, as further described in FIGS. 3 and 4.

The bounding box may be a polygon that wraps around the text cluster. In the exemplary document (100), rectangular bounding boxes are used to delimit snippets 1-6 (102.1-102.6). At least two types of snippets are assumed to exist in a document: Data fields (106.1-106.3) contain data values that one may want to extract from the imaged document, and labels (104.1-104.3) provide descriptors for the associated data fields. Consider the exemplary document (100). In this document, a label 1 (104.1) indicates that the associated data field contains an employer's name, address and ZIP code. In the associated data field 1 (106.1), the employer's name, address and ZIP code are provided.

In order to successfully extract information from an imaged form, it is important to properly associate labels with data fields. For example, the exemplary document (100) includes two data fields with names addresses and ZIP codes; one for the employee and one for the employer. Associating these data fields with the wrong labels could result in potentially serious errors.

The association of data fields with labels may need to be reliably performed even in the presence of irregularities and variations. For example, the exact location where information is entered in data fields may vary from form to form. The location may shift within a box, different fonts and font sizes may be used, etc. Further, there may also be differences in the form itself, between forms of the same type. One form may have been printed with a higher contrast, whereas another form may have been printed with less contrast; forms may be slightly altered when a new version of a particular form is released, etc. In addition, a paper-based form may be damaged, e.g., it may be stained, it may be wrinkled, some of its content may be illegible, etc. Further, additional distortions may be introduced when a paper-based form is imaged. For example, the keystone effect may distort the image of the paper-based form, if a camera used for the imaging is not properly aligned with the paper-based document. Also, bounding boxes obtained by segmenting a document may not always properly identify a text cluster. For example, an address with additional space between lines may not be captured by a single bounding box but by multiple adjacent bounding boxes. In such a case, it would be necessary to identify the data fields delimited by these multiple bounding boxes as being associated with a single label.

The subsequently described system and methods may be used to schematize such documents, in accordance with one or more embodiments of the invention, thereby generating associations between initially unknown data fields and labels.

In the following description, the exemplary document (100) is repeatedly referred to. The exemplary document (100) is referred to in different scenarios, in which the various elements may be treated differently. For example, in FIG. 3, the exemplary document (100) is referred to as an example for a training image, used for training a schematization model. In this scenario, the elements of the exemplary document (100) (snippets, data fields, labels) are assumed to be known and understood. In contrast, in FIG. 4, the exemplary document (100) is referred to as an example for a document with fields to be schematized. In this scenario, the elements of the exemplary document (100) are assumed to be unknown.

Figure 2:
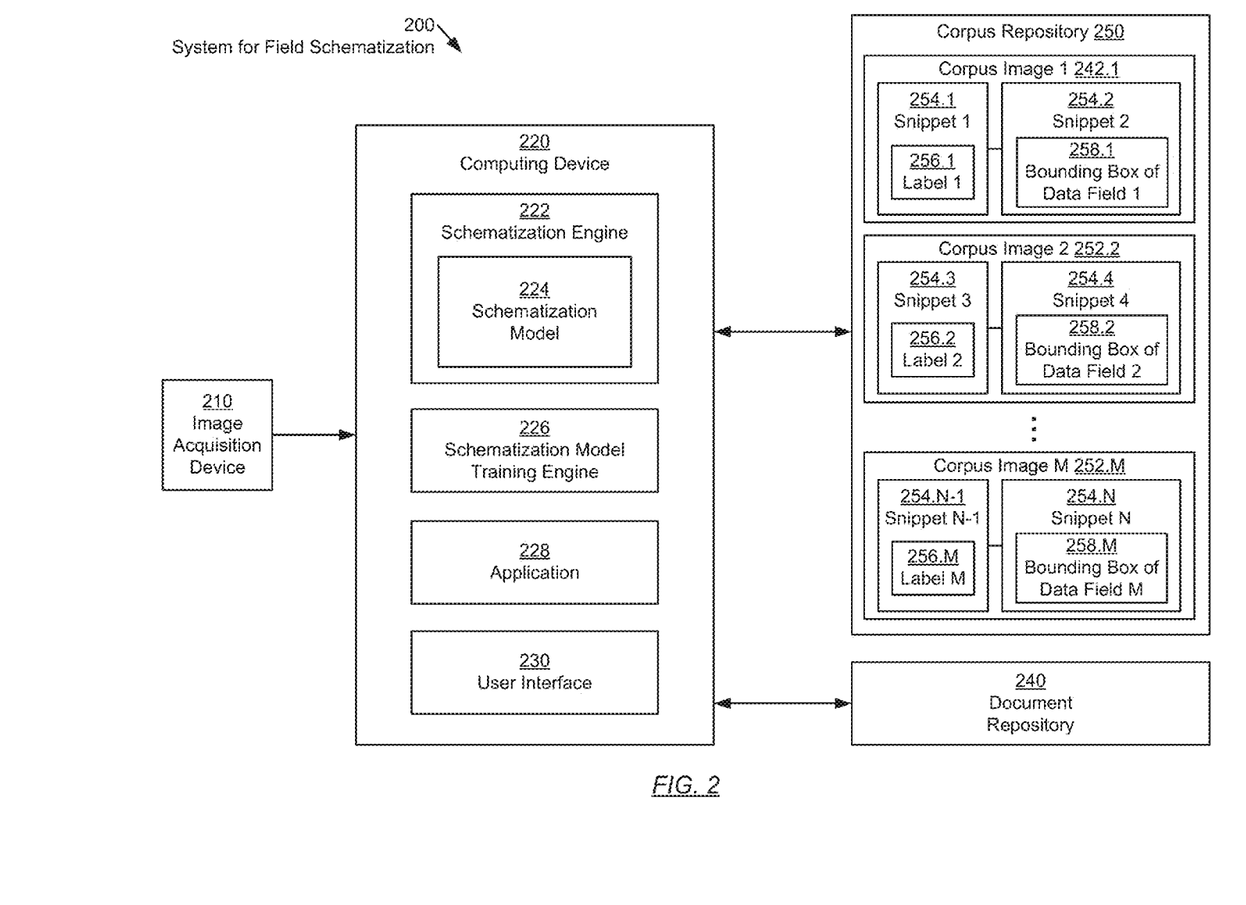
FIG. 2 shows a diagram of a system in accordance with one or more embodiments of the invention.

Turning to the FIG. 2 a system for field schematization, in accordance with one or more embodiments of the invention, is shown. The system (200) may include an image acquisition device (210), a computing device (220), a document repository (240) and a corpus repository (250). Each of these components is described below.

The image acquisition device (210), in accordance with one or more embodiments of the invention, is used to image a document, such as the exemplary document (100), shown in FIG. 1. The image acquisition device (210) may be a digital camera (e.g., a charge coupled device (CCD) or CMOS-based camera) such as the camera of a smartphone or a dedicated camera, or a document scanner. The image acquisition device (210) may generate a black & white, grayscale or color image which may then be provided to the computing device (220). The image acquisition device (210) may be connected to the computing device (220) using a wired or wireless interface. For example, a scanner may be connected to the computing device (220) using a universal serial bus (USB) interface. Alternatively, if a smartphone camera is used as the image acquisition device (210), a cellular network or a wireless local area network (WLAN) may be used to transmit the image captured by the smartphone camera to the computing device (220). Those skilled in the art will appreciate that the invention is not limited to a particular interface, and that any interface suitable for transmitting a captured image may be used. If the documents to be processed have already been imaged, the system (200) may not include an image acquisition device (210). An imaged document, obtained by the image acquisition device (210), may be stored in any image format such as jpeg, tiff, etc., or in non-image formats capable of embedding images, such as doc, pdf, etc. The imaged document may be stored in the document repository (240) and/or it may be processed by the schematization engine (222)

Continuing with the discussion of FIG. 1, the computing device (220) is used to process imaged documents, as further described below with reference to the flowcharts of FIGS. 3 and 4, in accordance with one or more embodiments of the invention. The computing device (220) may be a smartphone, a desktop personal computer, a server, or any other type of physical or virtual computing device capable of executing at least some of the steps described in FIGS. 3 and 4. The computing device (220) may be similar to the computing systems described in FIGS. 6.1 and 6.2.

The computing device (220), in accordance with one or more embodiments of the invention, includes a schematization engine (222), a schematization model training engine (226), and may further include an application (228) and a user interface (230). These various components may be implemented in hardware, software, firmware or a combination thereof. Each of these components is described below. Those skilled in the art will appreciate that, while these components in FIG. 1 are shown as being hosted by a single computing device (220), these components may alternatively be distributed over multiple networked computing devices.

Figure 4:
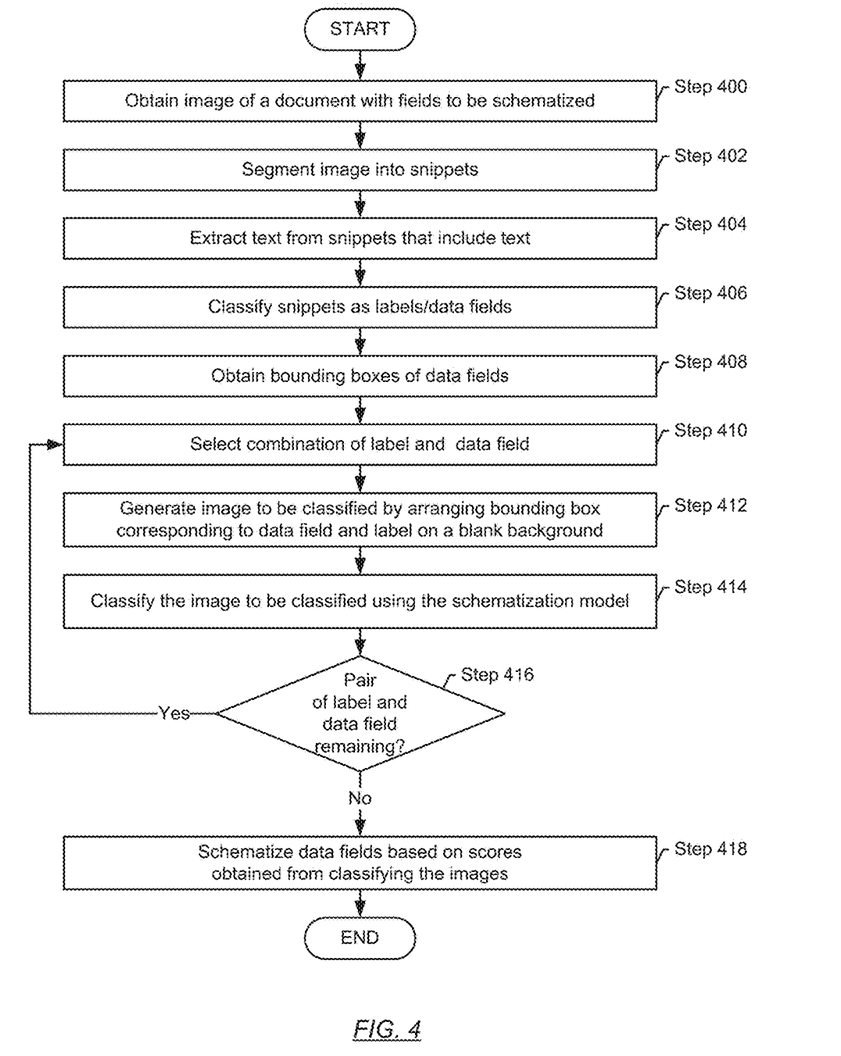
Figure 51:
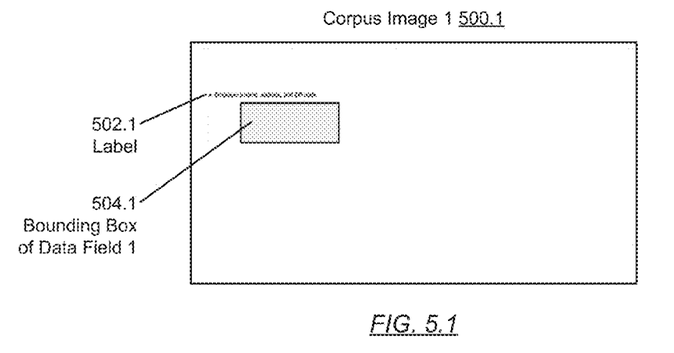
Figure 52:
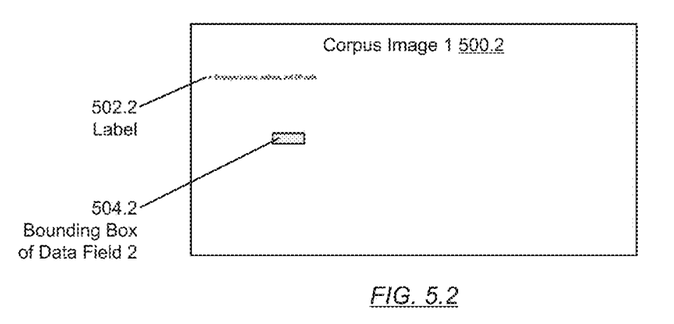
Figure 53:
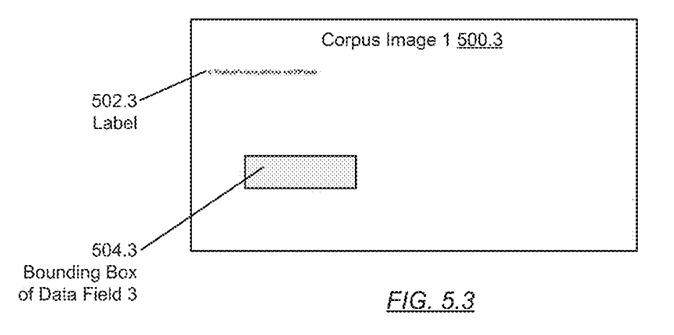

The schematization engine (222), in accordance with one or more embodiments of the invention, includes a set of machine-readable instructions (stored on a computer-readable medium) which, when executed by the computing device (220), implement the steps described in the flowchart of FIG. 4. These instructions may be executed sequentially, e.g., on a single processor or on a single processor core. At least some of the instructions may also be executed in parallel, e.g., by multiple cores, by multiple central processing units (CPUs) or by one or more graphics processing units (GPUs) used as parallel computing platforms.

The schematization engine (222), in accordance with one or more embodiments of the invention, includes a schematization model (224). The schematization model (224) may be used to perform the schematization on an imaged document, after an image preprocessing has been performed, as further described below. In one or more embodiments of the invention, the schematization model (224) is a convolutional neural network (CNN), trained to classify elements of imaged documents, as further described below. More specifically, the CNN, in accordance with one or more embodiments of the invention, is trained to assign known labels to unknown data fields as subsequently discussed with reference to FIG. 4. The CNN may be trained using a body of ground-truth data stored in the corpus repository (250). Training of the CNN enables the CNN to classify unknown data fields, based on visual characteristics of these unknown data fields, to enable association of the unknown data fields with the appropriate labels. The visual characteristics or features that are considered by the schematization model (224) may include locations of visual elements (including labels and bounding boxes that represent data fields), relative to each other and/or relative to the image boundaries. The visual features considered by the CNN may further include other visual elements such as edges and corners (e.g., of boxes that surround the data fields) and/or any other visual features such as visual features of adjacent data fields, labels, etc.

In one or more embodiments of the invention, the CNN includes convolutional layers and dense layers, for example, two convolutional layers and two dense layers. Those skilled in the art will appreciate that, while in the described system (200) the schematization model (224) is a CNN, other classification methods capable of performing classifications based on patterns in images may be used. For example, other types of artificial neural networks, maximum likelihood, support vector machines, or any other classification method may be used, without departing from the invention. In one or more embodiments of the invention, the training of the schematization model (224) and/or the use of the schematization model (224) may be performed in a parallelized environment. For example, the CNN may be executed on one or more GPUs.

Figure 3:
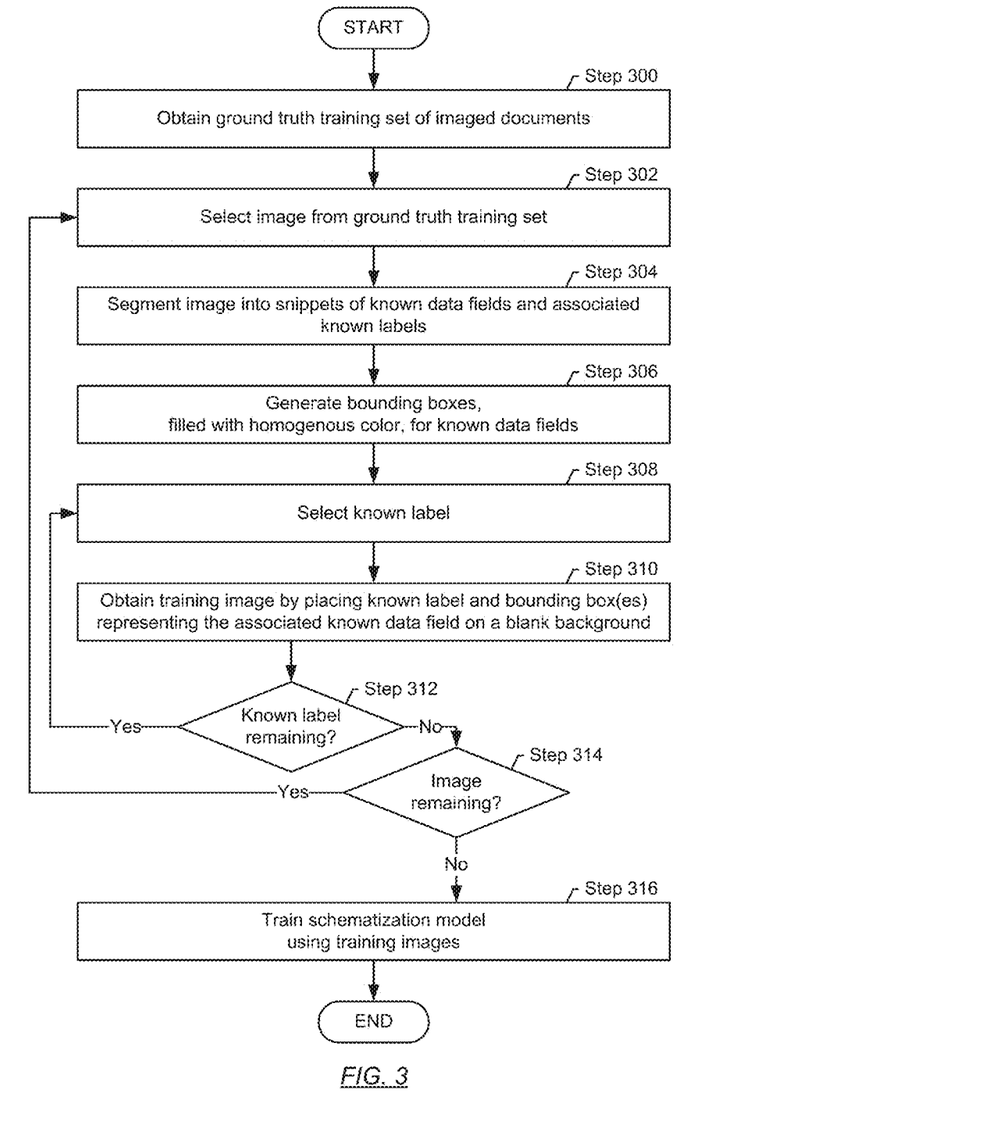
FIGS. 3 and 4 show flowcharts in accordance with one or more embodiments of the invention.

The schematization model training engine (226), in accordance with one or more embodiments of the invention, includes a set of machine-readable instructions (stored on a computer-readable medium) which, when executed by the computing device (220), implement the steps described in the flowchart of FIG. 3. These steps may be used to establish a schematization model (224) that may then be used to perform schematizations. While FIG. 2 shows the schematization model training engine (226) as being hosted on a single computing device (220), together with the schematization engine (222), the schematization model training engine (226) may alternatively execute on one computing device (220), while the schematization engine (222) may be executing on another computing device(s) (220). For example, a schematization model (224) may initially be trained as described in FIG. 3, using one computing device (220). The trained schematization model may then be distributed to other computing devices that perform the schematization as described in FIG. 4. Consider, for example, a scenario in which the schematization is performed on a smartphone, on images captured by the smartphone. In this scenario, the schematization engine (222) executes on the smartphone, using a schematization model (224) that may have been downloaded to the smartphone from a central server that has previously performed the training of the schematization model (224) using the schematization model training engine (226).

The application (228), in one or more embodiments of the invention, is software that accepts the schematized data fields of the imaged document as inputs, i.e., the output of the method described with reference to FIG. 4. The application, once having received the schematized data fields may perform additional operations on the content extracted from the schematized data fields. Assume, for example that the document, imaged by the image acquisition device, is a tax form, e.g., similar to the exemplary document (100) shown in FIG. 1. The application (228) may, thus, be a tax software that uses data extracted from the schematized data fields to calculate an amount of taxes that is owed or that may be refunded. In order to perform such calculations, the application (228) may in addition consider other data, e.g., obtained from other forms or otherwise available, for example from a database. Those skilled in the art will appreciate that the application may be any application that accepts or requires data that is obtainable from the schematized data fields of the imaged document.

The user interface (230), in one or more embodiments of the invention, enables a user to control or influence the schematization of data fields in imaged documents, and may include control elements for selecting an imaged document to be schematized, a display area to view the imaged document and/or to view the schematized results, etc. The user interface (230) may be a graphical user interface (GUI) that may further include additional elements that provide control over the interaction between the application (228) and the schematization engine (222) when providing schematization results to the application (128). These elements may include, for example, widgets that enable a selection of the schematization results to be provided to the application.

Continuing with the discussion of FIG. 2, the document repository (240), in accordance with one or more embodiments of the invention, contains imaged documents similar to the exemplary imaged document shown in FIG. 1. Many such imaged documents, for example thousands or even millions of imaged documents, may be stored in the document repository (240). These imaged documents may have been obtained during prior use of the system for field schematization, or in other ways. Assume, for example, that the system for field schematization (200) is used by a tax preparation service provider to perform income tax calculations for its clients. Many tax forms may have been uploaded by clients every year and may be archived in the document repository (240). These forms, while generally standardized, may include a variety of deviations such as they may occur for imaged forms. For example, the document repository (240) may contain imaged forms in which the arrangement of content slightly varies due to printing tolerances. Other imaged documents may be imperfect images of documents that may suffer from optical distortions, stains on the documents, damages to the documents that make some of their content illegible, documents with fluctuating contrast, documents with changing logos and/or watermarks, etc. The documents in the document repository (240) may thus include a spectrum of variations as they may also be encountered when images of new documents are obtained. Accordingly, the imaged documents in the document repository (240) may serve as a source of training data that, after the preprocessing further described below, can be used to train the schematization model (224). The schematization model (224) may thus be applicable to newly obtained imaged documents. While the document repository (240) is described as containing imaged documents, the document repository (240) may alternatively contain synthetic images, or a combination of imaged documents and synthetic images.

Continuing with the discussion of FIG. 2, the corpus repository (250), in accordance with one or more embodiments of the invention, includes preprocessed data that may be used for training the schematization model (224) as described in detail with reference to FIG. 3. The data in the corpus repository (250) may include corpus images (252.1-252.M). Each of those corpus images may have been generated from one of the imaged documents in the document repository (240), as described below with reference to FIG. 3.

In one or more embodiments of the invention, a corpus image includes a blank background on which snippets (254.1-254.N) are placed. A snippet, in accordance with one or more embodiments of the invention, is a segment of the imaged document that is extracted from the imaged document, as previously illustrated in FIG. 1. A corpus image includes a single snippet that includes a label (256.1.256.M), and one or more snippets that include a bounding box (248.1-248.M) representing a data field that is associated with the label. Assume, for example, that the tax form in FIG. 1 was submitted by a client to determine her income tax. The tax form was processed by the system (200), and various fields, including labels and data fields were identified during the processing. In FIG. 1, three labels (104.1-104.3) and the associated three data fields (106.1-106.3) are highlighted. These three labels and three data fields are captured by six snippets (102.1-102.6). Corpus images (252.1-252.M) may be produced from these six snippets as further described in FIG. 3.

Assume that one corpus image (252.1) is generated for the combination of label 1 (104.1) and the bounding box representing data field 1 (106.1) in FIG. 1. Both label and bounding box are placed on the blank background of the corpus image at locations that match the locations of the label and the data field in the form of FIG. 1. The resulting corpus image is illustrated in FIG. 5.1. Another corpus image (252.2) is generated for the combination of label 2 (102.2) and the bounding box representing data field 2 (106.2) in FIG. 1. The resulting corpus image is illustrated in FIG. 5.2. Any number of corpus images may be generated from an imaged document, depending on how many pairs of labels and data fields are identified in the form. Further, because the document repository (240) may contain many documents, additional corpus images may be stored in the corpus repository (250), based on pairs of labels and data fields obtained from these additional imaged documents. The corpus images, generated as described with reference to FIG. 3, may be stored in the corpus repository (250).

Both the document repository (240) and the corpus repository (250) may be any type of storage unit and/or device (e.g., a file system, database, collection of tables, or any other storage mechanism) for storing images. Further, these repositories may include multiple different storage units and/or devices. The multiple different storage units and/or devices may or may not be of the same type or located at the same physical site.

While FIG. 2 shows a configuration of components, other configurations may be used without departing from the scope of the invention. For example, various components may be combined to create a single component. As another example, the functionality performed by a single component may be performed by two or more components that may be communicatively connected using a network connection.

FIGS. 3 and 4 show flowcharts in accordance with one or more embodiments of the invention. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 3, a method for training a schematization model, in accordance with one or more embodiments of the invention, is shown. The method may be used to train, from a ground truth training set of imaged documents, the schematization model, in order to enable the schematization model to classify, in a newly obtained image of a document, unknown data fields by associating them with known labels. The method of FIG. 3 may be performed prior to using the schematization model, using imaged documents stored, for example, in a document repository. The stored imaged documents, in accordance with one or more embodiments of the invention, establish a ground truth, i.e., with the associations between data fields and labels being known. The method of FIG. 3 may further be performed to retrain an existing schematization model, e.g., after new training data in the form of imaged documents become available.

In Step 300, a ground truth training set of imaged documents is obtained. The ground truth training set may be specific to a particular type of document, e.g., a particular form, but may include variations of this form, as previously discussed. The ground truth training set of imaged documents may be obtained from the document repository. The ground truth training set of imaged documents may include any number of imaged documents.

In Step 302, one of the images of the documents in the ground truth training set is selected for further processing.

In Step 304, the selected image is segmented to obtain snippets of data fields and associated known labels. The segmentation may be performed, for example, using an optical character recognition (OCR) configured to detect text clusters in the selected image. Any method capable of detecting text clusters in an image may be used. The obtaining of snippets is illustrated in FIG. 1, where six snippets are shown, with three snippets representing data fields and three snippets representing labels. In one or more embodiments of the invention, the labels are known and therefore recognized as such because the selected image is ground truth data, i.e., the data in the selected image is understood. Further, because the selected image is ground truth data, data fields are also recognized as such. In addition, it is also known what data field(s) is/are associated with a particular known label.

In Step 306, bounding boxes are generated for the known data fields. Those bounding boxes may be filled with a homogenous color. The geometry and location of the bounding boxes may be selected to enclose the data fields detected in Step 304. In one embodiment of the invention, the bounding boxes form boundaries that tightly wrap around text clusters of data fields. Any color may be used to fill the bounding boxes.

In Step 308, a known label is selected in the selected image, for further processing. For example, in FIG. 1, one of the three labels is selected.

In Step 310, the selected known label and the bounding box(es) representing the associated data field(s) are placed on a blank background to generate a training image. In one embodiment of the invention, the training image is sized to match the size of the selected image, and the locations of the selected known label and the bounding box(es) are identical to the corresponding locations in the selected image. Relative locations between the label, the data field(s) and the image boundaries may therefore be maintained. Exemplary training images that result from performing Step 310 on the exemplary imaged form of FIG. 1 are shown in FIGS. 5.1-5.3. The obtained training image may further be stored for future use as a corpus image in the corpus repository.

In Step 312, a determination is made about whether additional known labels exist for the selected image. If additional known labels exist, the method may repeat Steps 308 and 310. For example, in FIG. 1 three known labels are shown, and Steps 308 and 310 are therefore performed three times to process all three known labels, resulting in the training images shown in FIGS. 5.1-5.3. If no additional known labels are remaining in the selected image, the method may proceed to Step 314.

In Step 314, a determination is made about whether additional images, previously obtained from the ground truth set of imaged documents, are remaining. If additional images are remaining, Steps 302-312 may be repeated for these additional images. If no additional images are remaining, the method may proceed to Step 316. Once Step 316 is reached, a complete training set may be available for training the schematization model.

In Step 316, the schematization model is trained. A subset of training images may be selected as an input for training the schematization model, and the remaining training images may be used for assessing the performance of the trained schematization model. For example, 80% of the training images may be used for training the schematization model, whereas the remaining 20% may be used for testing the trained schematization model. Because the training images originate from ground truth data, with labels and associated data fields being known, supervised learning methods may be applied to train the schematization model. As previously described, training images may include labels and bounding boxes filled with a uniform color, with the bounding boxes representing the data fields associated with the labels, as illustrated, for example, in FIGS. 5.1-5.3.

The trained schematization model may be capable of identifying, for unknown data fields in a newly obtained imaged document, the associated labels. More specifically, the trained schematization model may perform a classification of an unknown data field in an image submitted to the schematization mode based on geometric features, such as the shape of the bounding box and the location of the bounding box, relative to the entire image and/or relative to other features in the image, e.g., relative to the label. In one or more embodiments of the invention, other features may further be considered by the schematization model. For example, the schematization model may be trained on features that surround the bounding boxes of the data fields. Such features may include lines that separate different elements in forms, boxes that surround data fields, and/or any other visual features that are present in the form or document and may, thus, help with classification. In one or more embodiments of the invention, the output of the schematization model is a classification score. A high classification score indicates a high likeliness that a combination of a bounding box representing a data field and a label, found in the image being classified by the schematization model, are associated, whereas a low classification score suggests that a combination of a bounding box and a label are not associated.

Turning to FIG. 4, a method for schematizing fields in documents, in accordance with one or more embodiments of the invention, is shown. The method may be used to process an imaged document in which the association between data fields and labels is unknown. The schematization, in accordance with one or more embodiments of the invention, exploits visual characteristics in imaged forms, learned by the schematization model, as described in FIG. 3, to determine the association between data fields and labels. The result of the schematization, in accordance with an embodiment of the invention, is that the association between data fields and labels is understood, such that values in the data fields can be properly processed in subsequent steps.

In Step 400, an image of a document with fields to be schematized is obtained. The image of the document may be obtained from an imaging device or from a document repository.

In Step 402, the obtained image is segmented into snippets. The segmentation may be performed, for example, using an optical character recognition (OCR) configured to detect text clusters in the obtained image. Any method capable of detecting text clusters in an image may be used. Because the obtained image is initially unknown, the content of the snippets, and whether a snippet is a label or a data field may be unknown when the segmentation is performed.

In Step 404, text is extracted from the snippets obtained in Step 402. The text may be extracted using OCR.

In Step 406, the snippets are classified as labels or data fields. The classification may be performed based on the extracted text obtained in Step 404. The extracted text may be compared to known labels, e.g., labels stored in the corpus repository. A probabilistic approach may be used, and if an extracted text is determined to match a known label with a high likeliness, the snippet is considered to contain this known label. No exact match between the extracted text and a label stored in the corpus repository is necessary to identify a match. Accordingly, the method may appropriately handle labels that are partially occluded, e.g., by stains, labels that include typographical errors, etc. Snippets that are not identified as including known labels may be assumed to contain data fields.

In Step 408, bounding boxes are obtained for the data fields. The geometry and location of the bounding boxes may be selected to enclose the data fields detected in Step 406. In one embodiment of the invention, the bounding boxes form boundaries that tightly wrap around the text clusters in the data fields.

In the subsequent steps 410-418, combinations of identified and known labels and identified but unknown data fields are evaluated to determine whether they are associated. Each combination is scored, and the combination with the highest score is considered to be the combination that correctly identifies an association of a data field with a label.

In Step 410, a combination of an identified, known label and an identified but unknown data field is selected.

In Step 412, the selected, known label and the bounding box associated with the selected but unknown data field are placed on a blank background to generate an image to be classified. The image to be classified is sized to match the size of the image obtained in Step 400, and the locations of the selected, known label and the bounding box are identical to the corresponding locations in the image obtained in Step 400. Relative locations are therefore maintained. Exemplary images to be classified are shown in FIGS. 5.1-5.3.

In Step 414, the image to be classified, generated in Step 412, is classified by the schematization model. The classification may result in a classification score that indicates the probability of the classified image containing a known label with an associated data field. In one or more embodiments of the invention, a high classification score indicates a high probability of the label and the data field in the image being associated, whereas a low classification score indicates that the label and the data field are unlikely to be associated. As previously discussed, the schematization model assesses the image to be classified based on visual features. If the visual features in the image to be classified are similar to visual features of a particular training image or group of training images, a high classification score may indicate this similarity, suggesting that label and the data field in the image to be classified are identical to the label and the data field in the training image. Various visual features such as the location and the size of the bounding box that represents the data field, relative to the image itself and/or relative to other content in the image, if present, may be relied upon to make this assessment. Any visual feature that was included in the training images may be used by the schematization model to assess an image to be classified.

In Step 416, a determination is made about whether additional pairs of labels and data fields represented by the corresponding bounding boxes, exist. If additional such pairs exist, the method may repeat Steps 410-414. For example, in FIG. 1, assuming that FIG. 1 shows an image to be schematized, three known labels and three unknown data fields are shown, and Steps 410-414 may be repeated for all combinations of known labels and unknown data fields, thus resulting in nine possible combinations to be assessed by the schematization model. In one embodiment of the invention, the number of possible combinations is limited by geometric constraints. To minimize the number of possible combinations, only combinations in which there is spatial proximity between the label and the data field may be considered. For example, only the 5 or 10 data fields that are closest to a label may be considered. In the exemplary imaged document in FIG. 1, the combination of label 1 and data field 3 may not be considered due to the distance between label 1 and data field 3 exceeding a threshold.

If, in Step 416, a determination is made that no pairs of labels and data fields are remaining, the method may proceed to Step 418.

After the completion of Step 416, classification scores have been assigned to a series of images representing various configurations of labels and data fields. These classification scores indicate the likeliness of the images representing actual configurations of labels and associated data fields.

In Step 418, the data fields of the image obtained in Step 400 are schematized. The schematization is performed by selecting the images to which the schematization model assigned the highest classification score. These images are assumed to represent the correct associations of data fields with labels. Typically, one data field is associated with one label. However, it may be possible that multiple data fields are associated with a single label. This may occur, for example, when the segmentation in Step 402 incorrectly splits a single data field into multiple fragments, thus resulting in multiple bounding boxes representing the data field. Upon completion of the schematization, values of data fields (or in other words, the content of the data fields) in the imaged form are assumed to be known, based on the labels assigned to the data fields. Accordingly, these labeled values may be available for further processing. In one or more embodiments of the invention, the schematized data obtained from the imaged document may be stored in the corpus repository, thereby making it available for future use, e.g., for training a schematization model.

FIGS. 5.1-5.3 show exemplary training images, stored as corpus images, in accordance with one or more embodiments of the invention. Each of the corpus images (500.1-500.3) has a size identical to the size of the image from which the corpus image was derived. Each corpus image contains a label (502.1-502.3) and a bounding box (504.1-504.3) representing a data field. The bounding boxes may be filled with a homogenous color. Labels and bounding boxes may be placed on an otherwise blank background. The shown corpus images may be obtained as described with reference to FIG. 3. Similar images may further be obtained from an imaged document to be schematized, as described with reference to FIG. 4.

Various embodiments of the invention have one or more of the following advantages. Embodiments of the invention reduce the effort associated with entering data that are provided in paper-based documents. More specifically, embodiments of the invention enable a user to capture an image of a document, and the schematization of the fields in the document is subsequently performed in accordance with embodiments of the invention, without requiring further intervention by the user. The result may be a rapid extraction of data from the document. The extraction may exceed human accuracy. In particular, in scenarios in which forms are damaged, a user may not be able to manually extract data from the form, e.g., when labels are missing or damaged, or when they are covered by stains or otherwise illegible. Further, unlike other methods that use templates of documents or forms, embodiments of the invention provide good performance in presence of variations in the format of the document or form. For example, embodiments of the invention are capable of handling variations of documents, such as layout changes due to revisions, printing tolerances, etc. Further, embodiments of the invention are robust to suboptimal imaging such as changing lighting conditions, image distortions resulting from, for example, a poorly oriented digital camera, etc.

Figure 61:
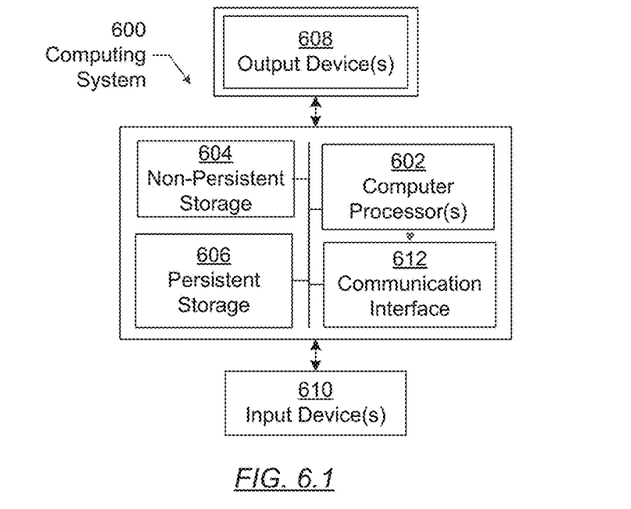

Embodiments of the invention may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 62:
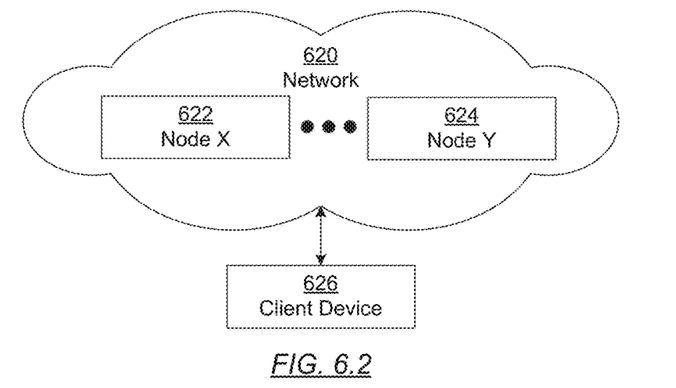

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for schematizing fields in documents, the method comprising:
    segmenting an image of a document into a plurality of snippets;
    classifying a first snippet of the plurality of snippets as a first label, based on content of the first snippet;
    classifying a second snippet of the plurality of snippets as a second label;
    classifying a third snippet of the plurality of snippets as a data field;
    selecting a first combination comprising the first label and the data field;
    generating, for the first combination, a first image to be classified, comprising the first label and the data field;
    classifying the first image to be classified using a schematization model to obtain a first classification score;
    selecting a second combination comprising the second label and the data field;
    generating, for the selected second combination, a second image to be classified, comprising the second label and the data field;
    classifying the second image to be classified using the schematization model to obtain a second classification score;
    determining that the first classification score is greater than the second classification score; and
    identifying, based on the determining step, that the data field is associated with the first label.

2. The method of claim 1, wherein the document is an at least partially structured form.

3. The method of claim 1, wherein the image of the document is obtained by one selected from a group consisting of scanning the document and photographing the document.

4. The method of claim 1, wherein segmenting the image into the plurality of snippets comprises:
    detecting text clusters using an optical character recognition; and
    generating a bounding box for each detected text cluster.

5. The method of claim 4, wherein segmenting the image into the plurality of snippets further comprises:
    including, in the bounding box, visual features surrounding the text cluster.

6. The method of claim 1, wherein classifying the first snippet as the first label, based on content of the first snippet comprises making a determination that a text of the first snippet is found in a corpus repository.

7. The method of claim 1, wherein generating the first image to be classified comprises arranging the first label and the data field on a blank background, wherein the data field, in the first image, is represented by a bounding box associated with the data field.

8. The method of claim 7, wherein the bounding box is filled with a homogenous color.

9. The method of claim 1, further comprising:
    classifying a fourth snippet as a third label;
    selecting a third combination comprising the third label and the data field; and
    rejecting the third combination based on a geometric distance between the third label and the data field exceeding a threshold.

10. The method of claim 1, further comprising training the schematization model.

11. The method of claim 10, wherein training the schematization model comprises:
   obtaining a ground truth set of images of documents;
   for each image in the ground truth set of images of documents, obtaining at least one training image by:
      segmenting the image into known labels and associated data fields;
      determining bounding boxes for the data fields;
      generating the at least one training image by placing one of the known labels and the associated data field on a blank background; and
   training the schematization model using the training images.

12. The method of claim 1, wherein the schematization model is a convolutional neural network.

13. A non-transitory computer-readable storage medium storing a program, which when executed on a processor, performs instructions comprising:
   segmenting an image of a document into a plurality of snippets;
   classifying a first snippet of the plurality of snippets as a first label, based on content of the first snippet;
   classifying a second snippet of the plurality of snippets as a second label;
   classifying a third snippet of the plurality of snippets as a data field;
   selecting a first combination comprising the first label and the data field;
   generating, for the first combination, a first image to be classified, comprising the first label and the data field;
   classifying the first image to be classified using a schematization model to obtain a first classification score;
   selecting a second combination comprising the second label and the data field;
   generating, for the selected second combination, a second image to be classified, comprising the second label and the data field;
   classifying the second image to be classified using the schematization model to obtain a second classification score;
   determining that the first classification score is greater than the second classification score; and
   identifying, based on the determining step, that the data field is associated with the first label.

14. The computer-readable storage medium of claim 13, wherein segmenting the image into the plurality of snippets comprises:
   detecting text clusters using an optical character recognition; and
   generating a bounding box for each detected text cluster.

15. The computer-readable storage medium of claim 14, wherein segmenting the image into the plurality of snippets further comprises:
   including, in the bounding box, visual features surrounding the text cluster.

16. The computer-readable storage medium of claim 13, wherein classifying the first snippet as the first label, based on content of the first snippet comprises making a determination that a text of the first snippet is found in a corpus repository.

17. The computer-readable storage medium of claim 13, wherein generating the first image to be classified comprises arranging the first label and the data field on a blank background, wherein the data field, in the first image, is represented by a bounding box associated with the data field.

18. The computer-readable storage medium of claim 17, wherein the bounding box is filled with a homogenous color.

19. The computer-readable storage medium of claim 13, further comprising instructions for:
   classifying a fourth snippet as a third label;
   selecting a third combination comprising the third label and the data field; and
   rejecting the third combination based on a geometric distance between the third label and the data field exceeding a threshold.

20. The computer-readable storage medium of claim 13, further comprising instructions for training the schematization model by:
   obtaining a ground truth set of images of documents;
   for each image in the ground truth set of images of documents, obtaining at least one training image by:
      segmenting the image into known labels and associated data fields;
      determining bounding boxes for the data fields;
      generating the at least one training image by placing one of the known labels and the associated data field on a blank background; and
   training the schematization model using the training images.

21. The computer-readable storage medium of claim 13, wherein the schematization model is a convolutional neural network.

22. A system for schematizing fields in documents, the system comprising:
   a hardware processor and memory;
   software instructions stored in the memory and configured to execute on the hardware processor, which, when executed cause the hardware processor to:
      segment an image of a document into a plurality of snippets;
      classify a first snippet of the plurality of snippets as a first label, based on content of the first snippet;
      classify a second snippet of the plurality of snippets as a second label;
      classify a third snippet of the plurality of snippets as a data field;
      select a first combination comprising the first label and the data field;
      generate, for the first combination, a first image to be classified, comprising the first label and the data field;
      classify the first image to be classified using a schematization model to obtain a first classification score;
      select a second combination comprising the second label and the data field;
      generate, for the selected second combination, a second image to be classified, comprising the second label and the data field;
      classify the second image to be classified using the schematization model to obtain a second classification score;
      determine that the first classification score is greater than the second classification score; and
      identify, based on the determining step, that the data field is associated with the first label.

23. The system of claim 22, further comprising one selected from a group consisting of a document scanner and a digital camera, configured to obtain the image of the document.

24. The system of claim 23, wherein the software instructions, when executed further cause the hardware processor to train the schematization model by:

obtaining a ground truth set of images of documents;

for each image in the ground truth set of images of documents, obtaining at least one training image by:

segmenting the image into known labels and associated data fields;

determining bounding boxes for the data fields;

generating the at least one training image by placing one of the known labels and the associated data field on a blank background; and training the schematization model using the training images.

25. The system of claim 22, wherein the schematization model is a convolutional neural network.

* * * * *